US007781362B2

United States Patent
Beech, Jr. et al.

(10) Patent No.: US 7,781,362 B2
(45) Date of Patent: Aug. 24, 2010

(54) METHOD FOR PROTECTING CATALYST AGAINST CONTAMINANT INGRESS

(75) Inventors: James H. Beech, Jr., Kingwood, TX (US); Christopher David William Jenkins, South Caulfield (AU)

(73) Assignee: ExxonMobil Chemical Patents Inc., Houston, TX (US)

( * ) Notice: Subject to any disclaimer, the term of this patent is extended or adjusted under 35 U.S.C. 154(b) by 280 days.

(21) Appl. No.: 11/713,198

(22) Filed: Mar. 2, 2007

(65) Prior Publication Data

US 2007/0243997 A1 Oct. 18, 2007

Related U.S. Application Data

(60) Provisional application No. 60/792,516, filed on Apr. 17, 2006.

(51) Int. Cl.
*B01J 38/12* (2006.01)
(52) U.S. Cl. .......................................... 502/38; 502/34
(58) Field of Classification Search .................. 502/34, 502/38
See application file for complete search history.

(56) References Cited

U.S. PATENT DOCUMENTS

| 3,748,832 | A | * | 7/1973 | Furlong et al. ................. 96/356 |
| 3,918,906 | A | * | 11/1975 | Small et al. .................. 436/161 |
| 4,340,399 | A | * | 7/1982 | Luthra et al. .................. 95/133 |
| 2005/0154155 | A1 | * | 7/2005 | Battiste ....................... 526/72 |
| 2005/0234278 | A1 | | 10/2005 | Van Egmond et al. |
| 2006/0040821 | A1 | | 2/2006 | Pujado |
| 2007/0224098 | A1 | * | 9/2007 | Miller ........................ 423/210 |

* cited by examiner

Primary Examiner—Jennifer K Michener
Assistant Examiner—Carlos Barcena
(74) Attorney, Agent, or Firm—Kevin M. Faulkner; Melinda R. Michalerya

(57) ABSTRACT

Degradation of catalyst activity for silicoaluminophosphate catalysts is minimized for oxygenate-to-olefin reaction systems that are exposed to airborne salt concentrations above a threshold value. When airborne salt concentrations above the threshold value are detected, an air intake flow can be diverted into a cleaning flow path and/or an alternative source of regeneration media can be provided.

7 Claims, 2 Drawing Sheets

METHOD FOR PROTECTING CATALYST AGAINST CONTAMINANT INGRESS

CROSS-REFERENCE TO RELATED APPLICATIONS

This application claims priority to application Ser. No. 60/792,516, filed Apr. 17, 2006, which is hereby incorporated by reference.

FIELD OF THE INVENTION

This invention relates to methods for preserving the activity of molecular sieve catalysts used during oxygenate-to-olefin conversion processes. In particular, this invention relates to methods for preserving the activity of silicoaluminophosphate molecular sieve catalysts.

BACKGROUND OF THE INVENTION

Oxygenate-to-olefin conversion reactions typically involve contacting an oxygenate feedstock with a formulated molecular sieve catalyst. As the reaction proceeds, coke (a carbonaceous material) builds up on the molecular sieve catalyst. This coke is removed by passing the catalyst through a regenerator.

During the conversion reaction the molecular sieve serves as a catalyst and therefore is not directly consumed by the oxygenate conversion reaction. The molecular sieve, however, can become damaged or degraded for a variety of reasons. Damaged or degraded molecular sieve is less effective at catalyzing an oxygenate-to-olefin reaction. Due to the cost of replacing degraded catalyst, reducing or eliminating degradation of molecular sieve within an oxygenate-to-olefin reaction system is desirable.

U.S. Patent Application Publication 2006/0040821 (Pujado) describes a method for performing an oxygenate-to-olefin reaction. In Pujado, methods are provided for removing metal salts from the gas stream fed to a regenerator.

U.S. Pat. No. 7,479,468 (van Egmond et al.) describes incorporation of an air separation unit into an oxygenate-to-olefin reaction system. In van Egmond et al., one use for the streams produced by the air separation unit can be as a regeneration medium for regeneration of coked catalyst.

What is desired are methods that allow for more efficient conversion of oxygenates to olefins. In particular, methods are desired that allow for protection of catalyst used in such conversions during periods of extended use.

SUMMARY OF THE INVENTION

In an embodiment, a method is provided for regenerating molecular sieve catalyst in an oxygenate-to-olefin reaction system that allows for protection of catalyst against contamination due to ingress of contaminants into the regenerator. A gas flow is received for replenishing a regeneration medium. Preferably, the gas flow can be received by at least one gas intake. Preferably, any concentrated salt sources are located downwind from the at least one gas intake. A metal salt content is then detected to determine if the metal salt content is above a threshold value. The metal salt content can be detected in the received gas flow or in a sampling stream. If the detected salt content is above a threshold value, the received gas flow is diverted into a cleaning flow path. Preferably, the cleaning flow path can include an electrostatic precipitator, a filter or coalescer, or a device for contacting the received gas flow with water. The diverted gas flow is then added to the regeneration medium for regenerating molecular sieve catalyst in the oxygenate-to-olefin reaction system.

In another embodiment, a method is provided for regenerating molecular sieve catalyst in an oxygenate-to-olefin reaction system that allows for protection of catalyst against contamination due to ingress of contaminants into the regenerator. A gas flow is received for replenishing a regeneration medium. Preferably, the gas flow can be received by at least one gas intake. Preferably, any concentrated salt sources are located downwind from the at least one gas intake. A metal salt content is then detected to determine if the metal salt content is above a threshold value. If the detected salt content is above a threshold value, a secondary gas flow is activated. This secondary gas flow is added to the regeneration medium for regenerating molecular sieve catalyst in the oxygenate-to-olefin reaction system.

DETAILED DESCRIPTION OF THE EMBODIMENTS

Figure 1:
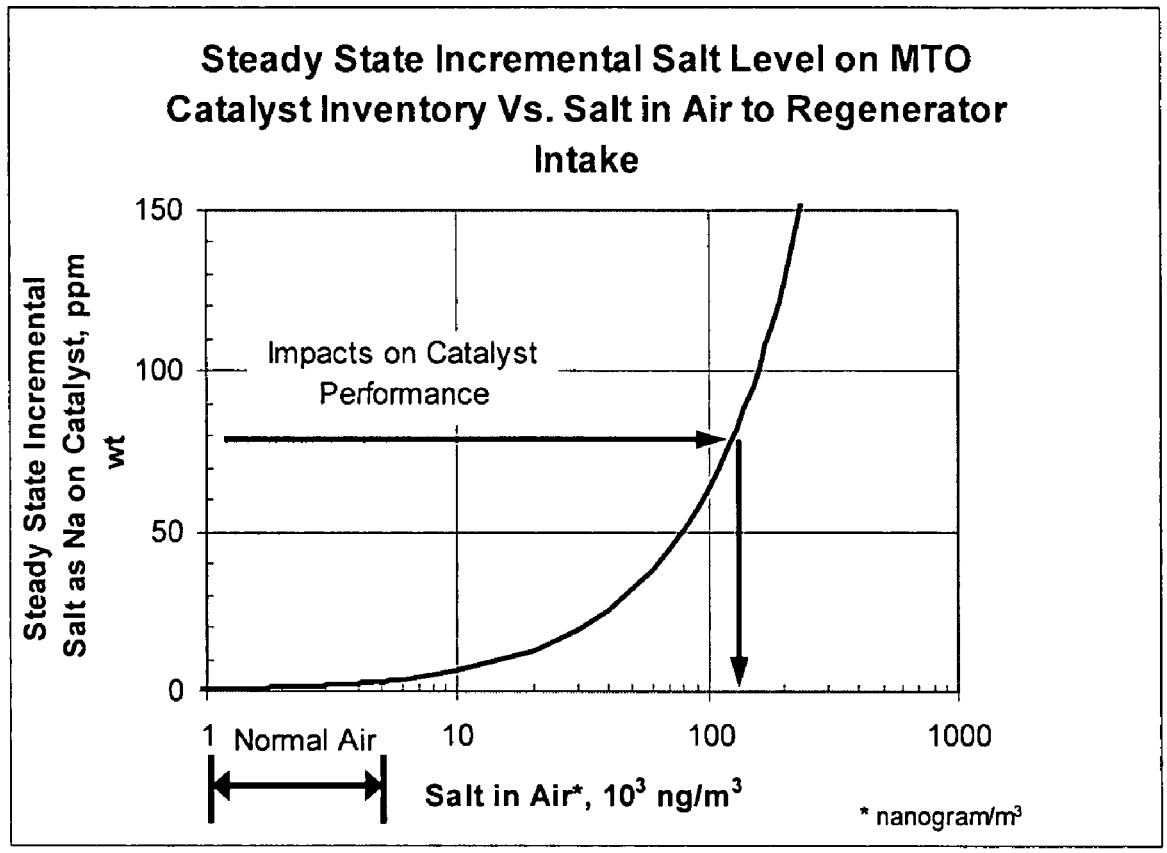
FIG. 1 depicts data modeling a correlation between airborne salt content and sodium contamination on regenerated catalyst.

I. Protecting Catalytic Activity of a Silicoaluminophosphate Molecular Sieve

In various embodiments, the invention provides a method for regenerating molecular sieve catalyst using conditions that reduce or minimize the potential for catalyst degradation due to metal or metal salt contamination of the catalyst. During regeneration, any metals in the atmosphere used for regeneration could settle on the catalyst. For example, air in the vicinity of a large body of sea water can potentially contain a variety of airborne metal salts. Metals can also be introduced into the regeneration medium from an equipment source. For example, lubrication oils contain metal complexes that could enter the regeneration medium if a lubrication seal fails. During consecutive regeneration cycles, the concentration of metal on the catalyst could build to levels that cause degradation of catalyst activity. In an embodiment, this buildup of metal concentration on catalyst can be avoided by reducing the level of metals and/or metal salts contained within the air stream (or other gas stream) used to provide the atmosphere within the regenerator.

In another embodiment, the air or gas stream used to supply the atmosphere for the regenerator can be monitored. The air stream can be monitored directly for metal salt content, or the air stream can be monitored for total particulate level as an indicator of metal salt content. If a threshold level of metal salt and/or total particulates is detected in the air supply, a cleaning step can be initiated to reduce the level of metal salt in the air supply. Alternatively, upon detection of a threshold level of metal salt, an alternative gas supply can be activated to provide the regenerator atmosphere. The alternative gas supply can be used until the level of metal salt falls below a second threshold.

II. Regeneration of Molecular Sieve Catalyst

In an embodiment, the invention provides a method for reducing or minimizing the degradation of molecular sieve catalyst during regeneration. During an oxygenated to olefin reaction, an oxygenate feedstock is contacted with a molecular sieve catalyst in a reactor. This produces the olefin product, which is separated from the catalyst in one or more disengaging vessels. During the conversion reaction, coke is deposited on the catalyst as a by-product. The buildup of coke on the catalyst is controlled by passing the catalyst through a regenerator.

In an embodiment, at least a portion of the coked catalyst composition is withdrawn from one or more of the disengaging vessels and introduced to the regeneration system. The regeneration system comprises a regenerator where the coked catalyst composition is contacted with a regeneration medium, preferably a gas containing oxygen, under conventional regeneration conditions of temperature, pressure and residence time. In an embodiment, a gas-solids flow exiting a regenerator may be passed through cyclones configured according to the invention. Alternatively, at least a portion of the catalyst can be flowed to bypass the regeneration system. The catalyst bypassing the regenerator can be flowed to another desired portion of the reaction system, such as flowing the catalyst directly into a catalyst cooler or allowing the catalyst to rejoin a fluidized bed in the reactor. Non-limiting examples of suitable regeneration media include one or more of oxygen, $O_3$, $SO_3$, $N_2O$, NO, $NO_2$, $N_2O_5$, air, air diluted with nitrogen or carbon dioxide, oxygen and water (U.S. Pat. No. 6,245,703), carbon monoxide and/or hydrogen.

In an embodiment, the regeneration medium is replenished at least in part by drawing in air from the vicinity of the regenerator. For example, a conduit to the regenerator can be fluidly connected to an air compressor. The compressor can intake air from the surrounding atmosphere and compress to approximately match the pressure within the regenerator. This compressed air can then be used to replenish the regeneration medium.

In an embodiment where air is used to replenish the regeneration media, any substances contained within the air prior to compression will likely remain in the air and enter the regenerator. For example, if the regenerator is located near a body of salt water, any external air used to replenish the regeneration medium will likely contain a variety of metal salts normally present in sea water, such as sodium chloride and/or other metal salts of potassium, magnesium, and calcium.

As catalyst is cycled through a reaction system, the catalyst will be repeatedly exposed to any metals (such as metal salts) contained in the regeneration medium. Over time, this exposure to metals could lead to buildup of metal contamination on the catalyst. Note that metal contamination includes contamination due to metal ions. Metal contamination can reduce the effectiveness of catalyst, such as by causing reductions in catalyst activity. An example of the amount of metal salt that can be found in air near large bodies of salt water is described in "Aerosol Sampling Project Newsletter", Number 24, January 2001, Australian Nuclear Science and Technology Organization, Physics Division, which found airborne salt contents from 900-2,900 $ng/m^3$ at a coastal location. With regard to the composition of the airborne salt content, note that a typical seawater sample with 3.5% salinity can have the following approximate elemental concentrations:

| Sodium | 11,000 ppm (primarily as NaCl) |
|---|---|
| Magnesium | 1,300 ppm |
| Calcium | 400 ppm |
| Potassium | 400 ppm |

Although metal salt contamination can pose a problem, the amount of metal salt found in the air near a large body of salt water is not sufficient to cause significant catalyst degradation. FIG. 1 depicts a steady state calculation of the amount of salt as sodium on catalyst inventory regenerated using air having a given level of salt content. In FIG. 1, the horizontal axis corresponds to the amount of salt (micrograms weight per cubic meter) entrained in air that enters a regenerator. The vertical axis represents the amount of metal ion as sodium contamination per gram of catalyst that results from the entrained salt. In FIG. 1, it is assumed that all metal ions contained in the salt entering the regenerator become associated with catalyst for contamination. The catalyst losses and make-up to the system are assumed to be at a rate of 0.085 lb catalyst/klbs methanol feed.

In the calculation shown in FIG. 1, the typical amount of airborne salt contained in air, including air near a large body of salt water, is indicated by arrows in the lower left corner of the figure. Also depicted in FIG. 1 is a point corresponding to roughly 80 ppm of salt as sodium on catalyst, which is the level of metal contamination that is expected to lead to catalyst degradation. In the calculation shown in FIG. 1, an airborne salt content of over 100,000 $ng/m^3$ is necessary to produce a steady state sodium content that can lead to degradation. As this is roughly 50 times greater than the airborne salt content in air near a large body of salt water, the salt present in air would need to be concentrated in some way to pose a contamination problem.

In an embodiment, one potential type of concentrated salt source can be a saltwater cooling tower. For example, when a regenerator is part of a reaction system that includes an oxygenate-to-olefin reactor, one or more saltwater cooling towers may also be present as part of the reaction system. The exhaust from a saltwater cooling tower can have salt contents sufficient to cause catalyst degradation due to salt contamination if the exhaust were incorporated into the regeneration medium. Preferably, a saltwater cooling tower (or another type of cooling tower) can include a drift eliminator. A drift eliminator is a structure located near or at the top of a cooling tower that reduces the number of airborne water droplets that are emitted from the tower. A variety of drift eliminator designs are commercially available. One example of a drift eliminator design is a series of plates spaced closely together. The plates can be shaped to have a sinusoidal shape, or to resemble a series of chevrons. Another potential source of metals from a saltwater cooling tower is due to anti-corrosion, anti-algal, and anti-bacterial agents used to maintain the tower. Such agents often contain metals or metal complexes, including chromates or metallorganic compounds. The metals found in these agents can also be incorporated into water droplets emitted from a cooling tower, and thus contribute to potential metal contamination.

In an embodiment, when a potential concentrated source of airborne salt is present in the vicinity of the compressor intake for a regenerator, the concentration of salt entering the compressor can be monitored. In such an embodiment, if an excessive salt concentration is detected, corrective action can be taken to prevent further salt from entering the regenerator for a period of time. For example, instead of replenishing the regeneration medium via compressed external air, a dedicated source of an oxygen-containing gas can be used to feed the regenerator, such as gas from a storage vessel. Alternatively, the air entering the compressor can be diverted through a system such as a cleaning flow path that scrubs or washes salt out of the air, such as passing the air through a fresh water scrubber or an electrostatic precipitator, coalescing water droplets out of the air, or passing the air through a filter or mesh pad. The cleaning flow path for removing salt from the air can be located to remove salt either prior to or after compression of the air. In still another embodiment, a cryogenic air separation unit could be used to provide a purified source of air.

In embodiments where the air entering the compressor is diverted through a cleaning flow path, the cleaning flow path can reduce the metal salt content of the gas flow to 1,000,000 ng/m$^3$ or less of salt content, or 100,000 ng/m$^3$ or less, or 50,000 ng/m$^3$ or less. In various embodiments, the methods according to the invention allow the metal content on regenerated catalyst to be maintained at 10,000 ppm by weight or less, or 1,000 ppm or less, or 100 ppm or less, or 50 ppm or less.

In alternative embodiments, additional steps can be taken to reduce the potential for metal salt contamination of regenerated catalyst by accounting for potential sources of concentrated airborne salts, such as cooling towers. In order to reduce the amount of airborne salt produce by a concentrated salt source, drift eliminators can be installed. The positioning of concentrated salt sources can also be selected so that the concentrated salt source is downwind from any air intakes for the regenerator. The distance between the concentrated salt source and any regenerator air intakes can also be increased to reduce the likelihood of concentrated salts entering the regenerator.

Various detection methods can be used to determine airborne salt content. In an embodiment, airborne salt content can be directly measured by quantifying the amount of salt contained in a known volume of air. For example, a stream of air could be diverted from the intake for the compressor. This stream of air could be passed over a filter. When a predetermined quantity of air has passed over the filter, the filter could be removed and analyzed using ion beam analysis to determine the amount of metal and/or salt captured.

In another embodiment, airborne salt content can be measured by capturing the salt content in a known quantity of a solvent, such as methanol or water, and determining the conductivity of the solution. For example, a sampling stream containing a known quantity of air can be received into a cooler to condense out metal salts in the sampling stream along with any water vapor. The sampling stream can be collected from the air stream entering the compressor, or the sampling stream can be derived from a separate intake flow. The condensate formed from the sampling stream can be added to a known quantity of water or methanol to form a metal salt solution. The conductivity of the resulting solution can then be determined to identify the amount of metal salt present in the sampling stream. In a preferred embodiment, the conductivity of the solution can be determined using a Schott Gerate Conductivity Measurement Cell (Type CG857; Cell LF100) at a temperature from 7° C. to 50° C.

In still another embodiment, detection of total airborne particulates can be used as a proxy for the amount of salt in the air. In such an embodiment, the amount of salt contained in air for a given level of particulates could be quantified, such as by the ion beam technique described above. A correlation could then be developed between the amount of salt present in the air versus the total particulates. Once this correlation was determined, a technique for determining the total particulate level in the air could be used to determine the airborne salt level. One technique for determining total particulate content is laser light scattering. Alternatively, a device such as an "opacity meter" for measuring total transmitted light could be used to measure particulates. Neither technique directly measures the elemental content of particles, but both could be used to detect increases in total particulate levels that would correlate to increased salt content in the air. The correlation could represent a correlation specific to a location. The correlation could also be specific to a time period within the year.

In various embodiments, when a detector is used to determine that either the salt or total particulate level has increased beyond a threshold, the flow of external air into the compressor can be stopped. This threshold level can correspond to a direct measurement of metal content, a conductivity measurement of a solution formed from airborne metal salts, a total particle count, or another type of measured value. When the flow of external air into the compressor is stopped, an alternative source for the regeneration media can then be used to feed the regenerator, such as air from a cryogenic separation pump. Note that detection methods that measure total particulates will have some susceptibility to detecting false positive results. For example, an "opacity meter" will also show reduced light transmission when a fog of condensation passes through the detector.

Figure 2:
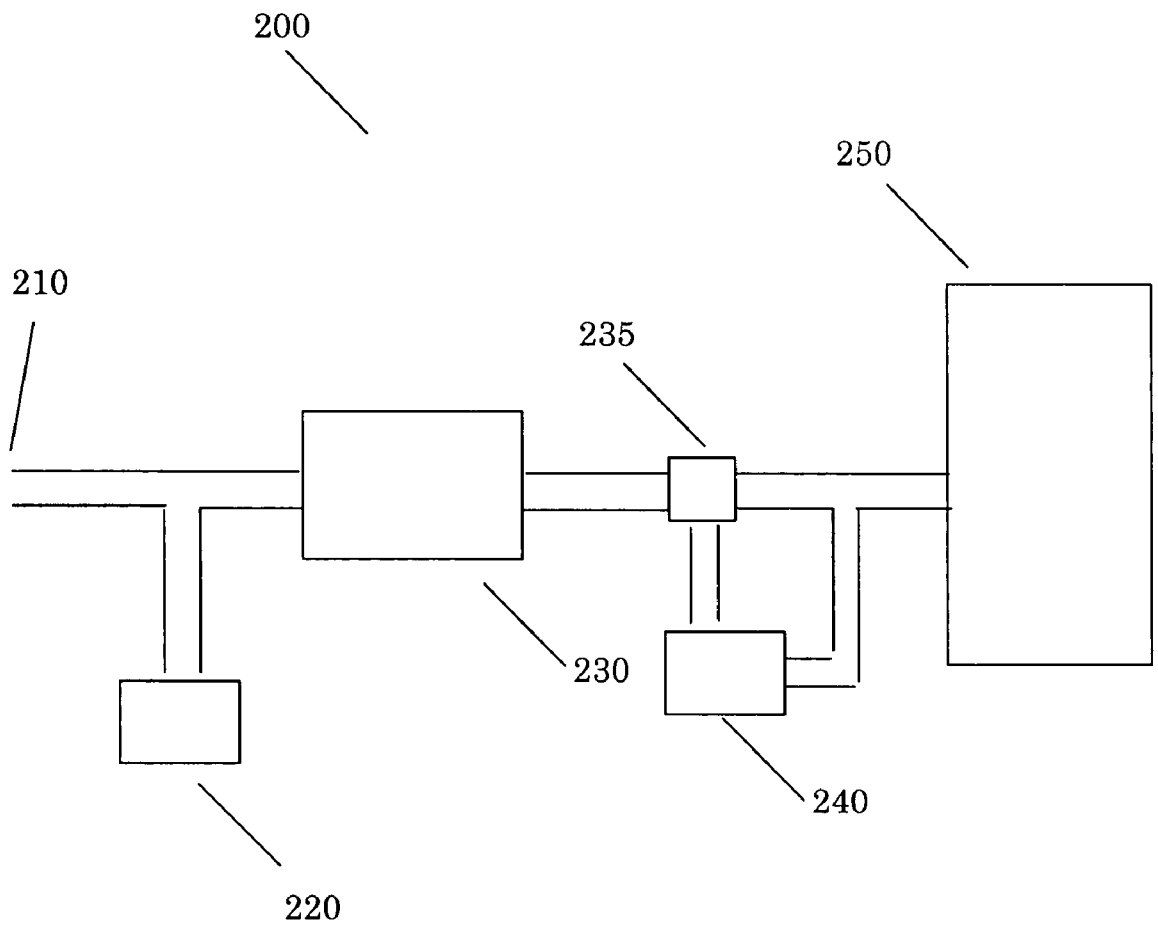
FIG. 2 schematically shows an apparatus according to an embodiment of the invention.

FIG. 2 schematically shows a sample apparatus 200 for monitoring the intake of air into a regenerator. In the embodiment shown in FIG. 2, air enters the apparatus 200 at inlet 210. A portion of the air collected at inlet 210 is diverted into a detector 220 for determining the salt content of the air. The detector 220 can be a detector for directly detecting elemental concentrations in the air; a detector for determining the conductivity of a solution formed from airborne salts; a particle detector for determining a total particulate level; or another type of detector. Detectors such as the conductivity detector or the total particulate level would be used to determine the salt content based on a predetermined correlation between airborne salt levels and the values measured by the detector 220. The main portion of the air flow passes through compressor 230. Compressor 230 modifies the pressure of the air flow in order to match the pressure of the flow with the pressure in regenerator 250. In an alternative embodiment, detector 220 could be placed in the main air flow, either upstream or downstream from the compressor 230.

Prior to entering the regenerator, the air flow can be passed through an electrostatic precipitator 240, or another washing or scrubbing device for removing airborne salt. As shown in FIG. 2, the electrostatic precipitator 240 is located in a side flow path between the compressor 230 and regenerator 250. In this embodiment, valve 235 is activated to divert air into the side flow path when detector 220 indicates a salt and/or particle amount above a threshold level. Alternatively, the air flow can be passed through a filter or a coalescer (such as a mesh pad) to trap airborne salt. The filter/coalescer could then be replaced on regularly scheduled basis.

Suitable regeneration conditions are those capable of burning coke from the coked catalyst composition to a desired level. Coke levels on the catalyst composition are measured by withdrawing the catalyst composition from the conversion process and determining its carbon content. In an embodiment, an increased level of coke remains on the catalyst after regeneration. Maintaining a higher level of coke both reduces the required regeneration time for catalyst to reach a desired coke level and increases the coke burning rate. Preferably, the regeneration conditions remove coke to less than 1.0 weight percent based on the total weight of the coked molecular sieve catalyst composition entering the regeneration system, and more preferably to less than 0.75 weight percent. Preferably, the regeneration conditions allow 0.4 weight percent or greater of coke to remain on the catalyst particles after regeneration, and more preferably more than 0.5 weight percent. Note that the weight of coke on catalyst can be alternatively expressed in terms of the amount of molecular sieve present within the catalyst. The weight of molecular sieve within a catalyst will be a fraction of the total catalyst weight. The weight percent of coke relative to the weight of molecular sieve can be determined by starting with the weight percent of coke relative to the total catalyst weight, and then dividing by the weight fraction of molecular sieve. In a preferred embodiment of the invention, the weight fraction of molecular sieve within the SAPO catalyst is 0.45.

The regeneration is conducted at temperatures that are designed to effectively remove coke in an industrially practical amount of time while reducing the likelihood of catalyst damage or degradation. In an embodiment, the regeneration temperature is 700° C. or less, or 675° C. or less, or 650° C. or less, or 625° C. or less. In another embodiment, the regeneration temperature can be 590° C. or greater, or 600° C. or greater, or 625° C. or greater.

In an embodiment, the regeneration pressure may be in the range of from about 15 psig (207 kPaa) to about 30 psig (310 kPaa). Preferably, the regeneration temperature is at least 20 psig (242 kPaa), or at least 25 psig (275 kPaa). In another embodiment, the residence time (or catalyst holdup) of the catalyst in the regenerator is at least 10 minutes, or at least 15 minutes, or at least 20 minutes. Alternatively, the residence time in the regenerator can be 30 minutes or less, or 25 minutes or less.

Preferably, the amount of oxygen in the regeneration flue gas (i.e., gas which leaves the regenerator) is at least 1.5% by volume, or at least 2.0%, or at least 2.2%, or at least 2.5%. In another embodiment, the amount of oxygen in the regeneration flue gas is not greater than 6.0% by volume, or not greater than 4.0% by volume, or not greater than 3.0% by volume. The amount of oxygen in the gas used to regenerate the coked catalyst (i.e., fresh or feed gas) is typically at least about 15 mole percent, preferably at least about 20 mole percent, and more preferably from about 20 mole percent to about 30 mole percent, based on total amount of regeneration gas fed to the regenerator. Note that an excess of oxygen in the regenerator is desirable when regenerating SAPO type catalysts in order to prevent degradation of the catalyst. It is believed that coke on catalyst will react with oxygen in the SAPO molecular sieve at high temperatures if no other source of oxygen is present. Such a reaction leads to degradation of the molecular sieve.

The burning of coke in the regeneration step is an exothermic reaction. When some amount of coke remains on the catalyst after leaving the regenerator fluidized catalyst bed, additional coke can be consumed in the region above the regenerator fluidized catalyst bed after the catalyst leaves the regenerator bed if excess oxygen is present. This can be referred to as dilute phase burning of the coke. Similarly, any CO present in the gas leaving the fluidized bed and/or exiting the regenerator can also undergo combustion to form $CO_2$. These two processes causing additional combustion outside of the regenerator fluidized catalyst bed will be referred to as afterburn. The additional combustion of coke and/or CO after leaving the regenerator fluidized catalyst bed results in additional heating of the catalyst, creating the potential for additional damage or degradation. In various embodiments, the combined temperature rise due to afterburn is maintained at 100° C. or less, or at 50° C. or less.

Regenerating particles to leave coke on the surface of 0.4 wt % or more can also lead to excess CO remaining in the regenerator flue gas. If the level of excess CO is too great, the flue gas will require additional processing before being allowed to exit the reaction system. In various embodiments, the level of CO in the regenerator flue gas is 1000 ppmv or less, or 500 ppmv or less, or 200 ppmv or less, or 100 ppmv or less.

In an embodiment, the temperature within the regeneration system can be further controlled by various techniques in the art including feeding a cooled gas to the regenerator vessel, operated either in a batch, continuous, or semi-continuous mode, or a combination thereof. A preferred technique involves withdrawing the regenerated catalyst composition from the regeneration system and passing it through a catalyst cooler to form a cooled regenerated catalyst composition. The catalyst cooler, in an embodiment, is a heat exchanger that is located either internal or external to the regeneration system. Other methods for operating a regeneration system are disclosed in U.S. Pat. No. 6,290,916 (controlling moisture).

The regenerated catalyst composition withdrawn from the regeneration system, preferably from the catalyst cooler, is combined with a fresh molecular sieve catalyst composition and/or re-circulated molecular sieve catalyst composition and/or feedstock and/or fresh gas or liquids, and returned to the reactor(s). In one embodiment, the regenerated catalyst composition withdrawn from the regeneration system is returned to the reactor(s) directly, preferably after passing through a catalyst cooler. A carrier, such as an inert gas, feedstock vapor, steam or the like, may be used, semi-continuously or continuously, to facilitate the introduction of the regenerated catalyst composition to the reactor system, preferably to the one or more reactor(s).

By controlling the flow of the regenerated catalyst composition or cooled regenerated catalyst composition from the regeneration system to the reactor system, the optimum level of coke on the molecular sieve catalyst composition entering the reactor is maintained. There are many techniques for controlling the flow of a catalyst composition described in Michael Louge, Experimental Techniques, Circulating Fluidized Beds, Grace, Avidan and Knowlton, eds., Blackie, 1997 (pp. 336-337).

III. Molecular Sieve Material

The molecular sieves used in the present invention are preferably silicoaluminophosphate (SAPO) molecular sieves or metal substituted SAPO molecular sieves. In an embodiment, the metal is an alkali metal of Group IA of the Periodic Table of Elements, an alkaline earth metal of Group IIA of the Periodic Table of Elements, a rare earth metal of Group IIIB, including the Lanthanides: lanthanum, cerium, praseodymium, neodymium, samarium, europium, gadolinium, terbium, dysprosium, holmium, erbium, thulium, ytterbium and lutetium; and scandium or yttrium of the Periodic Table of Elements, a transition metal of Groups IVB, VB, VIB, VIIB, VIIIB, and IB of the Periodic Table of Elements, or mixtures of any of these metal species. In one preferred embodiment, the metal is selected from the group consisting of Co, Cr, Cu, Fe, Ga, Ge, Mg, Mn, Ni, Sn, Ti, Zn and Zr, and mixtures thereof. In another preferred embodiment, these metal atoms discussed above are inserted into the framework of a molecular sieve through a tetrahedral unit, such as [$MeO_2$], and carry a net charge depending on the valence state of the metal substituent. For example, in one embodiment, when the metal substituent has a valence state of +2, +3, +4, +5, or +6, the net charge of the tetrahedral unit is between −2 and +2.

In one embodiment, the silicoaluminophosphate molecular sieve is represented, on an anhydrous basis, by the formula:

$$mR:(Si_xAl_yP_z)O_2$$

wherein R represents at least one templating agent, preferably an organic templating agent; m is the number of moles of R per mole of $(Si_xAl_yP_z)O_2$ and m has a value from 0 to 1, preferably 0 to 0.5, and most preferably from 0 to 0.3; x, y, and z represent the mole fraction of Al, P and Si as tetrahedral oxides. In an embodiment, m is greater than or equal to 0.2, and x, y, and z are greater than or equal to 0.01. In another embodiment, m is greater than 0.1 to about 1, x is greater than 0 to about 0.25, y is in the range of from 0.4 to 0.5, and z is in the range of from 0.25 to 0.5, more preferably m is from 0.15 to 0.7, x is from 0.01 to 0.2, y is from 0.4 to 0.5, and z is from 0.3 to 0.5.

In one embodiment, the silicoaluminophosphate molecular sieves have an Si/Al ratio of not greater than about 0.5, preferably not greater than about 0.3, more preferably not greater than about 0.2, still more preferably not greater than about 0.15, and most preferably not greater than about 0.1. In another embodiment, the Si/Al ratio is sufficiently high to allow for increased catalytic activity of the molecular sieve. Preferably, the silicoaluminophosphate molecular sieves contain Si and Al at a ratio of at least about 0.005, more preferably at least about 0.01, and most preferably at least about 0.02.

Non-limiting examples of SAPO molecular sieves useful herein include one or a combination of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, and metal-containing molecular sieves thereof. Of these, particularly useful molecular sieves are one or a combination of SAPO-18, SAPO-34, SAPO-35, SAPO-44, SAPO-56, AlPO-18, AlPO-34, and metal-containing derivatives thereof, such as one or a combination of SAPO-18, SAPO-34, AlPO-34, AlPO-18, and metal containing derivatives thereof, and especially one or a combination of SAPO-34, AlPO-18, and metal containing derivatives thereof.

In an embodiment, the molecular sieve is an intergrowth material having two or more distinct crystalline phases within one molecular sieve composition, such as a molecular sieve composition containing SAPO-18, which has an AEI framework type, and SAPO-34, which has a CHA framework type. Thus, the molecular sieve used herein may comprise at least one intergrowth phase of AEI and CHA framework types, especially where the ratio of CHA framework-type to AEI framework type, as determined by the DIFFaX method disclosed in U.S. Patent Application Publication No. 2002/0165089, is greater than 1:1.

The molecular sieves are made or formulated into catalysts by combining the synthesized molecular sieves with a binder and/or a matrix material to form a molecular sieve catalyst composition or a formulated molecular sieve catalyst composition. This formulated molecular sieve catalyst composition is formed into useful shape and sized particles by conventional techniques such as spray drying, pelletizing, extrusion, and the like.

In an embodiment, a molecular sieve catalyst can be characterized according to an Attrition Rate Index (ARI). The ARI methodology is similar to the conventional Davison Index method. The smaller the ARI, the more resistant to attrition; hence, the harder the catalyst. The ARI is measured by adding 6.0±0.1 g of catalyst, having a particle size ranging from 53 to 125 microns, into a hardened steel attrition cup. Approximately 23,700 scc/min of nitrogen gas is bubbled through a water-containing bubbler to humidify the nitrogen. The wet nitrogen is passed through the attrition cup, and exits the attrition apparatus through a porous fiber thimble. The flowing nitrogen removes the finer particles, with the larger particles being retained in the cup. The porous fiber thimble separates the fine catalyst particles from the nitrogen that exits through the thimble. The fine particles remaining in the thimble represent catalyst that has broken apart through attrition.

The nitrogen flow passing through the attrition cup is maintained for 1 hour. Fines collected in the thimble are removed from the unit, and a new thimble installed. The catalyst left in the attrition unit is attrited for an additional 3 hours, under the same gas flow and moisture levels. The fines collected in the thimble are recovered. The collection of fine catalyst particles separated by the thimble after the first hour are weighed. The amount in grams of fine particles divided by the original amount of catalyst charged to the attrition cup expressed on per hour basis is the ARI, in wt %/hr.

$$ARI=[C/(B+C)/D]\times 100\%$$

wherein
B=weight of catalyst left in the cup after the attrition test;
C=weight of collected fine catalyst particles after the first hour of attrition treatment; and
D=duration of treatment in hours after the first hour attrition treatment.

In an embodiment, the molecular sieve catalyst of this invention has an ARI of not greater than about 0.6 wt %/hr. Preferably, the molecular sieve catalyst has an ARI of not greater than about 0.5 wt %/hr, more preferably not greater than about 0.4 wt %/hr.

IV. Oxygenate-to-Olefin Reaction Systems

An example of a reaction system that benefits from this invention is an oxygenate-to-olefin process. Conventionally, oxygenate-to-olefin processes are carried out in a fluidized bed, fast fluidized bed, or riser reactor configuration where a fluid (gas) flow of a feedstock is passed through a bed of solid catalyst particles. More generally, the processes of this invention are applicable to gas-solids reaction systems where the solids are separated from the gas flow at some point during the reaction process, including systems where the gas is inert. The examples below describe an oxygenate-to-olefin reaction system that can be improved using the separation process of the invention.

Oxygenates used in this invention include one or more organic compound(s) containing at least one oxygen atom. In the most preferred embodiment of the process of the invention, the oxygenate in the feedstock is one or more alcohol(s), preferably aliphatic alcohol(s) where the aliphatic moiety of the alcohol(s) has from 1 to 20 carbon atoms, preferably from 1 to 10 carbon atoms, and most preferably from 1 to 4 carbon atoms. The alcohols useful as feedstock in the process of the invention include lower straight and branched chain aliphatic alcohols and their unsaturated counterparts. Non-limiting examples of oxygenates include methanol, ethanol, n-propanol, isopropanol, methyl ethyl ether, dimethyl ether, diethyl ether, di-isopropyl ether, formaldehyde, dimethyl carbonate, dimethyl ketone, acetic acid, and mixtures thereof. In the most preferred embodiment, the feedstock is selected from one or more of methanol, ethanol, dimethyl ether, diethyl ether or a combination thereof, more preferably methanol and dimethyl ether, and most preferably methanol.

The feedstock, in one embodiment, contains one or more diluent(s), typically used to reduce the concentration of the feedstock, and are generally non-reactive to the feedstock or molecular sieve catalyst composition. Non-limiting examples of diluents include helium, argon, nitrogen, carbon monoxide, carbon dioxide, water, essentially non-reactive paraffins (especially alkanes such as methane, ethane, and propane), essentially non-reactive aromatic compounds, and mixtures thereof. The most preferred diluents are water and nitrogen, with water being particularly preferred.

The diluent is either added directly to a feedstock entering into a reactor or added directly into a reactor, or added with a molecular sieve catalyst composition. In one embodiment, the amount of diluent in the feedstock is in the range of from about 1 to about 99 mole percent based on the total number of moles of the feedstock and diluent, preferably from about 1 to 80 mole percent, more preferably from about 5 to about 50, most preferably from about 5 to about 25. In another embodiment, other hydrocarbons are added to a feedstock either directly or indirectly, and include olefin(s), paraffin(s), aromatic(s) (see, for example, U.S. Pat. No. 4,677,242, addition of aromatics) or mixtures thereof, preferably propylene, butylene, pentylene, and other hydrocarbons having 4 or more carbon atoms, or mixtures thereof.

In a conventional oxygenate-to-olefin reaction, a feed containing an oxygenate is contacted in a reaction zone of a reactor apparatus with a molecular sieve catalyst at process conditions effective to produce light olefins, i.e., an effective temperature, pressure, WHSV (weight hour space velocity) and, optionally, an effective amount of diluent, correlated to produce light olefins. Usually, the oxygenate feed is contacted with the catalyst when the oxygenate is in a vapor phase. Alternately, the process may be carried out in a liquid or a mixed vapor/liquid phase. When the process is carried out in a liquid phase or a mixed vapor/liquid phase, different conversions and selectivities of feed-to-product may result depending upon the catalyst and reaction conditions. As used herein, the term reactor includes not only commercial scale reactors but also pilot sized reactor units and lab bench scale reactor units.

The conversion of oxygenates to produce light olefins may be carried out in a variety of large scale catalytic reactors, including, but not limited to, fluid-bed reactors and concurrent riser reactors as described in Fluidization Engineering, D. Kunii and O. Levenspiel, Robert E. Krieger Publishing Co. NY, 1977. Additionally, countercurrent free fall reactors may be used in the conversion process. See, for example, U.S. Pat. No. 4,068,136 and Fluidization and Fluid-Particle Systems, pp. 48-59, F. A. Zenz and D. F. Othmer, Reinhold Publishing Corp., NY 1960.

In one embodiment of this invention, the gas and solid particles are flowed through the gas-solids reactor system at a weight hourly space velocity (WHSV) of from about 1 $hr^{-1}$ to about 5,000 $hr^{-1}$, preferably from about 5 $hr^{-1}$ to about 3,000 $hr^{-1}$, more preferably from about 10 $hr^{-1}$ to about 1,500 $hr^{-1}$, and most preferably from about 20 $hr^{-1}$ to about 1,000 $hr^{-1}$. In one preferred embodiment, the WHSV is greater than 25 $hr^{-1}$, and up to about 500 $hr^{-1}$. In this invention, WHSV is defined as the total weight per hour of the gas flowing between reactor walls divided by the total weight of the solids flowing between the same segment of reactor walls. The WHSV is maintained at a level sufficient to keep the catalyst composition in a fluidized state within a reactor.

In another embodiment of the invention directed toward use of cyclones in conjunction with a riser reactor, the gas and solid particles are flowed through the gas-solids reactor system at a gas superficial velocity (GSV) of at least 1 meter per second (m/sec), preferably greater than 2 m/sec, more preferably greater than 3 m/sec, and most preferably greater than 4 m/sec. The GSV should be sufficient to maintaining the solids in a fluidized state, particularly in a fast fluidized state.

In still another embodiment, cyclones configured according to this invention can be used with a fixed fluidized bed reactor. In such an embodiment, the GSV can be as low as 0.03 m/s.

In yet another embodiment of the invention, the solids particles and gas are flowed through the gas-solids reactor at a solids loading of at least 0.1 lb/ft$^3$ (1.6 kg/m$^3$), or at least 0.5 lb/ft$^3$ (8 kg/m$^3$), or at least 1.0 lb/ft$^3$ (16 kg/m$^3$), or at least 2.0 lb/ft$^3$ (32 kg/m$^3$), or at least 4.0 lb/ft$^3$ (64 kg/m$^3$). Alternatively, the solids loading can be 5 lb/ft$^3$ (80 kg/m$^3$) or less, or 4.0 lb/ft$^3$ (64 kg/m$^3$) or less, or 2.0 lb/ft$^3$ (32 kg/m$^3$) or less.

In one practical embodiment, the process is conducted as a fluidized bed process or high velocity fluidized bed process utilizing a reactor system, a regeneration system and a recovery system. In such a process the reactor system conveniently includes a fluid bed reactor system having a first reaction region consisting of various fast fluid or dense fluid beds in series or parallel and a second reaction region within at least one disengaging vessel, comprising two or more cyclones configured and/or operated according to various embodiments of the invention. In one embodiment, the fast fluid or dense fluid beds and disengaging vessel are contained within a single reactor vessel. Fresh feedstock, preferably containing one or more oxygenates, optionally, with one or more diluent(s), is fed to the one or more fast fluid or dense fluid bed reactor(s) into which a molecular sieve catalyst composition or coked version thereof is introduced. In one embodiment, prior to being introduced to the reactor(s), the molecular sieve catalyst composition or coked version thereof is contacted with a liquid and/or vapor, preferably water and methanol, and a gas, for example, an inert gas such as nitrogen.

In an embodiment, the amount of fresh feedstock fed as a liquid and/or a vapor to the reactor system is in the range of from 0.1 weight percent to about 99.9 weight percent, such as from about 1 weight percent to about 99 weight percent, more typically from about 5 weight percent to about 95 weight percent based on the total weight of the feedstock including any diluent contained therein. The liquid and vapor feedstocks may be the same composition, or may contain varying proportions of the same or different feedstocks with the same or different diluents.

The process of this invention can be conducted over a wide range of temperatures, such as in the range of from about 200° C. to about 1000° C., for example from about 250° C. to about 800° C., including from about 250° C. to about 750° C., conveniently from about 300° C. to about 650° C., typically from about 350° C. to about 600° C., and particularly from about 350° C. to about 550° C.

Similarly, the process of this invention can be conducted over a wide range of pressures including autogenous pressure. Typically the partial pressure of the feedstock exclusive of any diluent therein employed in the process is in the range of from about 0.1 kPaa to about 5 MPaa, such as from about 5 kPaa to about 1 MPaa, and conveniently from about 20 kPaa to about 500 kPaa.

In embodiments involving a riser reactor, the solids particles and gas are flowed through the gas-solids reactor at a solids to gas mass ratio of about 0.5:1 to about 75:1. Preferably, the solids particles and gas are flowed through the gas-solids reactor at a solids to gas mass ratio of about 8:1 to about 50:1, more preferably from about 10:1 to about 40:1.

During the conversion of a hydrocarbon feedstock, preferably a feedstock containing one or more oxygenates, the amount of olefin(s) produced based on the total weight of hydrocarbon produced is greater than 50 weight percent, typically greater than 60 weight percent, such as greater than 70 weight percent, and preferably greater than 75 weight percent. In one embodiment, the amount of ethylene and/or propylene produced based on the total weight of hydrocarbon product produced is greater than 65 weight percent, such as greater than 70 weight percent, for example greater than 75 weight percent, and preferably greater than 78 weight percent. Typically, the amount of ethylene produced in weight percent based on the total weight of hydrocarbon product produced, is greater than 30 weight percent, such as greater than 35 weight percent, for example, greater than 40 weight percent. In addition, the amount of propylene produced in weight percent based on the total weight of hydrocarbon product produced is greater than 20 weight percent, such as greater than 25 weight percent, for example, greater than 30 weight percent, and preferably greater than 35 weight percent.

The feedstock entering the reactor system is preferably converted, partially or fully, in a reaction region into a gaseous effluent. In an embodiment, the reaction region is closely coupled to a plurality of separation devices, such as cyclone separators. In another embodiment, the gaseous effluent enters a disengaging vessel along with the coked catalyst composition. In such an embodiment, the disengaging vessel includes cyclone separators configured and/or operated according to the invention. In still another embodiment, the disengaging vessel also includes a stripping zone, typically in a lower portion of the disengaging vessel. In the stripping zone the coked catalyst composition is contacted with a gas, preferably one or a combination of steam, methane, carbon dioxide, carbon monoxide, hydrogen, or an inert gas such as argon, preferably steam, to recover adsorbed hydrocarbons from the coked catalyst composition. After exiting the separation devices and/or disengaging vessels, some or all of the catalyst can then be introduced to the regeneration system.

The gaseous reactor effluent is withdrawn from the disengaging system and is passed through a recovery system. There are many well known recovery systems, techniques and sequences that are useful in separating olefin(s) and purifying olefin(s) from the gaseous effluent. Recovery systems generally comprise one or more or a combination of various separation, fractionation and/or distillation towers, columns, splitters, or trains, reaction systems such as ethylbenzene manufacture and other derivative processes such as aldehydes, ketones and ester manufacture, and other associated equipment, for example, various condensers, heat exchangers, refrigeration systems or chill trains, compressors, knock-out drums or pots, pumps, and the like.

Non-limiting examples of these towers, columns, splitters or trains used alone or in combination include one or more of a demethanizer, preferably a high temperature demethanizer, a deethanizer, a depropanizer, a wash tower often referred to as a caustic wash tower and/or quench tower, absorbers, adsorbers, membranes, ethylene (C2) splitter, propylene (C3) splitter, and butene (C4) splitter.

Generally accompanying most recovery systems is the production, generation or accumulation of additional products, by-products and/or contaminants along with the preferred prime products. The preferred prime products, the light olefins, such as ethylene and propylene, are typically purified for use in derivative manufacturing processes such as polymerization processes. Therefore, in the most preferred embodiment of the recovery system, the recovery system also includes a purification system. For example, the light olefin(s) produced particularly in a MTO process are passed through a purification system that removes low levels of by-products or contaminants.

Typically, in converting one or more oxygenates to olefin(s) having 2 or 3 carbon atoms, a minor amount of hydrocarbons, particularly olefin(s), having 4 or more carbon atoms is also produced. The amount of $C_4+$ hydrocarbons is normally less than 20 weight percent, such as less than 10 weight percent, for example, less than 5 weight percent, and particularly less than 2 weight percent, based on the total weight of the effluent gas withdrawn from the process, excluding water. Typically, therefore, the recovery system may include one or more reaction systems for converting the $C_4+$ impurities to useful products.

The principles and modes of operation of this invention have been described above with reference to various exemplary and preferred embodiments. As understood by those of skill in the art, the overall invention, as defined by the claims, encompasses other preferred embodiments not specifically enumerated herein.

What is claimed is:

1. A method for regenerating molecular sieve catalyst in an oxygenate-to-olefin reaction system, comprising:
   receiving a recycled catalyst into a regenerator;
   receiving a gas flow in the regenerator for replenishing a regeneration medium, the gas flow received by drawing in air from the vicinity of the regenerator through a conduit fluidly connected to an air compressor, the compressor compressing the air to approximately match the pressure within the regenerator, followed by allowing the compressed air into the regenerator;
   detecting a metal salt content above a threshold value in the gas flow; wherein detecting a metal salt content comprises forming a solution from metal salt contained in a sampling stream; and detecting a conductivity of the metal salt solution; wherein the sampling stream is collected from the received gas flow and wherein the metal salt content is detected prior to compressing the received gas flow;
   activating a secondary gas flow; wherein activating a secondary gas flow comprises activating a gas flow from a gas storage vessel, wherein the secondary gas flow is air or a mixture of nitrogen and oxygen with levels of metal salt below a second threshold; and
   compressing the air to the pressure of the regenerator and adding the secondary gas flow to a regeneration medium for regenerating molecular sieve catalyst in an oxygenate-to-olefin reaction system; and wherein the regeneration takes place at a temperature of greater than 590° C. and the residence time of the catalyst is at least 10 min.

2. The method of claim 1, wherein detecting a metal salt content comprises detecting a total particulate count in the gas flow.

3. The method of claim 1, wherein detecting a metal salt content comprises detecting an elemental amount of a metal.

4. The method of claim 1, wherein activating a secondary gas flow comprises activating a gas flow from a cryogenic air separation unit.

5. The method of claim 1, wherein the received gas flow is air or a mixture of nitrogen and oxygen.

6. The method of claim 1, further comprising modifying a pressure of the secondary gas flow.

7. The method of claim 6, wherein the pressure of the secondary gas flow is matched to a pressure of the regeneration medium.

* * * * *